UNITED STATES PATENT OFFICE.

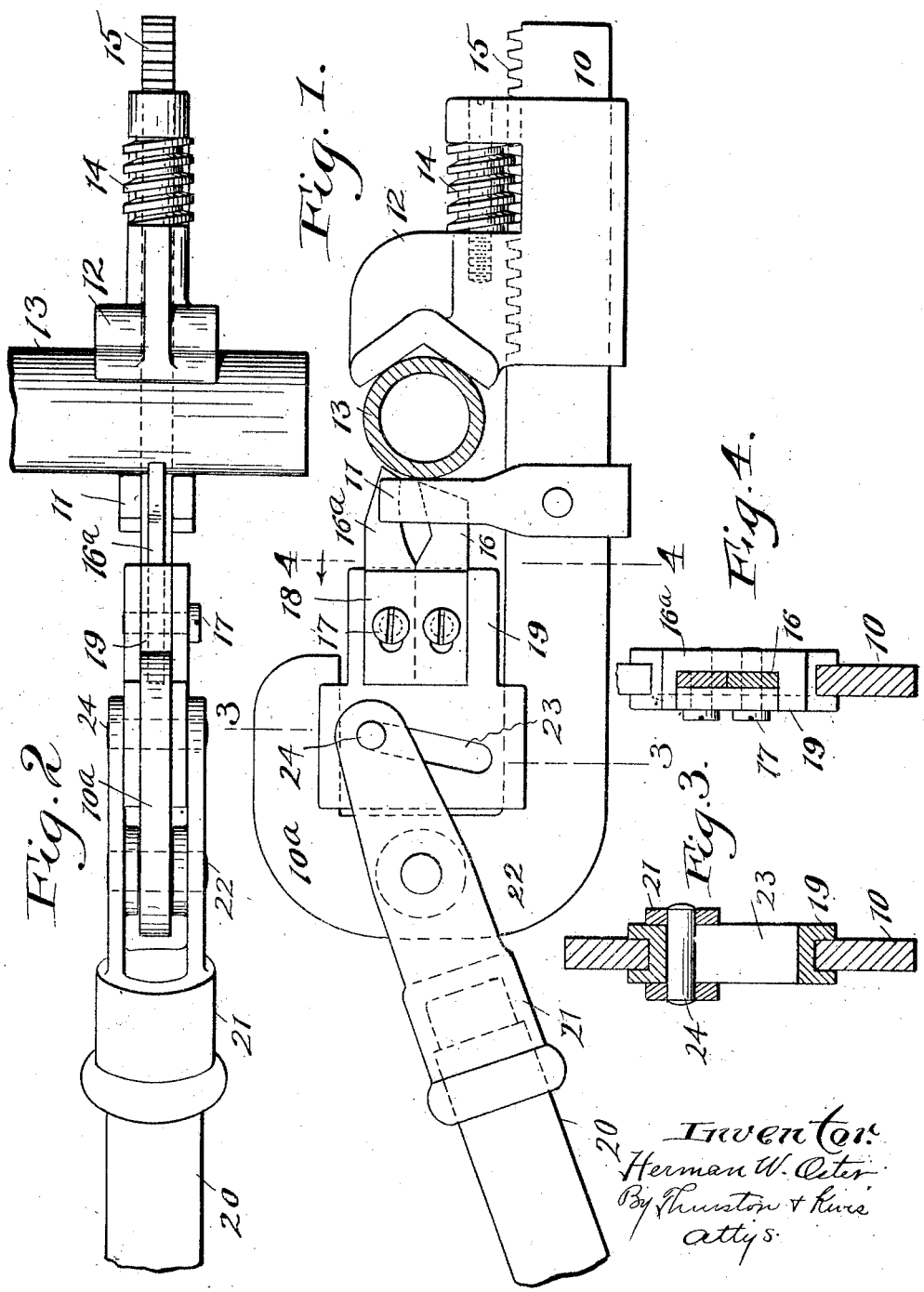

HERMAN W. OSTER, OF CLEVELAND, OHIO, ASSIGNOR TO THE OSTER MANUFACTURING COMPANY, OF CLEVELAND, OHIO, A CORPORATION OF OHIO.

PIPE-CUTTER.

1,367,323. Specification of Letters Patent. Patented Feb. 1, 1921.

Application filed March 19, 1917, Serial No. 155,667. Renewed April 30, 1920. Serial No. 377,972.

*To all whom it may concern:*

Be it known that I, HERMAN W. OSTER, a citizen of the United States, residing at Cleveland, in the county of Cuyahoga and State of Ohio, have invented a certain new and useful Improvement in Pipe-Cutters, of which the following is a full, clear, and exact description.

This invention relates to pipe cutters, and has for one of its objects to provide a cutter wherein the blade or cutting tool has a positive feed and is fed by the same movement which turns the cutter about the pipe being cut. Further, the invention aims to provide a pipe cutter having a cutting member preferably in the form of a cutter blade, which makes a clean cut and leaves no bur, and which is positively fed forward as the cutter is turned about the pipe without more than a predetermined depth of cut being possible and without any liability of the cutting tool being broken. Additionally, the invention aims to provide a cutter which is simple in construction, and wherein the cutting operation can be accomplished easily and quickly.

The invention may be briefly summarized as consisting in certain novel details of construction and combinations and arrangements of parts which will be described in the specification and set forth in the appended claims.

In the accompanying sheet of drawings wherein I have shown a preferred embodiment of my invention, Figure 1 is a side view of the cutter shown in position on the pipe to be cut; Fig. 2 is a top plan view of the same; Fig. 3 is a transverse sectional view substantially along the irregular line 3—3 of Fig. 1; and Fig. 4 is a similar view substantially along the line 4—4 of Fig. 1.

My invention is embodied in a hand operated pipe cutter which includes a frame or body 10 here shown in the form of a flat bar one end of which is curved or bent back upon itself as shown at 10ª, to form a holder and guide for a slide to be referred to presently. The frame 10 is provided with a fixed stop or abutment 11 and with a movable jaw 12 between which the pipe shown at 13 is clamped or held during the cutting operation at which time the cutting tool is turned or rotated about the pipe in the well known manner. The movable jaw can be adjusted toward and from the abutment 11 by turning a screw or worm 14 carried by the body of the movable jaw, and engaging teeth 15 formed on a portion of the frame 10. The cutting tool is in the form of a flat blade 16 which together with a guard 16ª which limits the depth of cut, are held by screws 17 and a suitably shaped clamping plate 18 in a holder in the form of a slide 19, the rear portion of which has grooved top and bottom edges having a sliding fit between the straight lower portion of the frame and the bent return portion 10ª. It will be understood that by the movement of the slide the cutting tool and guard may be moved toward or from the pipe 13 and can be fed forward gradually during the cutting operation. It may be here stated that the cutting tool 16 or the tool and guard 16ª engage the pipe between the upstanding sides of the abutment 11 which is preferably U-shaped and straddles the flat frame 10.

For the purpose of turning the cutter about the pipe and simultaneously positively feeding the blade or tool forward, I employ a lever 20 having a forked head 21 which is pivoted at 22 to the U-shaped end of the frame 10 just beyond and in line with the tool holder or slide 19. The fork of the head 21 straddles the end of the frame 10, extends inwardly beyond the pivot point 22 so as to overlap or extend alongside the rear or body portion of the slide 19, and at its free end the fork has a pin and slot connection with the slide with the slot so inclined and so disposed with reference to the pivot point of the lever that a forward camming or feeding action is caused on the slide and hence on the cutting tool when the cutter is being rotated about the pipe during the cutting operation. In other words, a component of the turning effort applied to the handle in turning the cutter about the pipe during the cutting operation is transmitted to the tool or blade holding slide 19 to move the same forwardly or in an endwise direction. This result is preferably accomplished by providing in the slide 19 and inclined slot 23 extending from side to side therethrough and by providing at the end of the fork a pin 24 which extends through this slot, the whole being so arranged that as the pipe cutter is turned about the axis of the pipe in a clockwise direction as shown in Fig. 1, the pin engages the forward inclined face of the slot producing the camming or feeding action. The inclination of the slot is such that the throw or camming action of the pin in the inclined slot is in excess of the thickness of the pipe or the feed of the cutting blade from the outer to the inner surface of the pipe.

In the use of this cutter after the jaw 12 has been adjusted so that the pipe will be gripped between the abutment and jaw, the operator will grasp the lever 20 and turn the cutter about the axis of the pipe. In so doing a predetermined feeding pressure is transmitted to the cutting tool which is thus constantly fed forward as long as the cutter is rotated about the pipe, or until the cutting operation is completed, the pressure of the tool on the pipe at all times having a predetermined relation to the turning force or pressure which is applied by the operator to the lever 20. With a cutting tool of this character a clean cut is made and at the same time the pressure is substantially uniform from the beginning to the end of the cutting operation; the depth of cut cannot exceed a predetermined amount and the pressure of the cutting tool on the pipe will not be excessive at any time. In fact, there is eliminated entirely the possibility of breakage of the tool by excessive pressure. Additionally since the feeding of the cutting tool takes place continuously and uniformly with the turning of the cutter about the pipe, my improved cutter has a distinct advantage over prior positive feed cutters in the respect that no interruptions of the cutting operation are required to feed the cutting tool forwardly.

Having thus described my invention, what I claim, is:

1. In a pipe cutter having a frame adapted to be rotated about the pipe to be cut, a cutting tool supported by the frame for movement in a straight line with reference thereto, and a turning lever pivotally connected to the frame and having a connection with the tool to feed it forwardly as the frame is turned through the turning lever, said connection between the turning lever and tool including an inclined surface on one member and a part on the other member which slides along said surface during the turning movement.

2. In a pipe cutter having a frame adapted to be turned about the pipe, a cutting tool, a holder for the tool supported by the frame for movement in a straight line, said holder having an inclined slot, and a lever pivoted to the frame for turning the cutter about the pipe to be cut, said lever provided with a member extending through said slot and having a forward camming action on the holder when the lever is being turned to operate the cutter.

3. In a pipe cutter, a frame having pipe engaging means, a cutting tool, a holder for the tool in the form of a slide supported by the frame for movement in a straight line and provided with an inclined slot, and a lever pivoted to the frame and having a pin extending through the slot of the slide whereby the slide and tool will be fed forwardly when the cutter is turned by turning the lever.

4. In a pipe cutter, a frame having pipe engaging means, and having a supporting guideway for a tool holder, a tool holder mounted for linear movement in said guideway and provided with an inclined slot, a lever for turning the frame about the pipe to be cut, said lever being pivoted to the frame in line with said holder and having a pin extending through the slot of the holder whereby the holder will be fed forwardly when the cutter is turned by turning the lever.

In testimony whereof, I hereunto affix my signature.

HERMAN W. OSTER.